US008626506B2

(12) United States Patent
Chengalvarayan et al.

(10) Patent No.: US 8,626,506 B2
(45) Date of Patent: Jan. 7, 2014

(54) METHOD AND SYSTEM FOR DYNAMIC NAMETAG SCORING

(75) Inventors: Rathinavelu Chengalvarayan, Naperville, IL (US); John J. Correia, Livonia, MI (US)

(73) Assignee: General Motors LLC, Detroit, MI (US)

( * ) Notice: Subject to any disclaimer, the term of this patent is extended or adjusted under 35 U.S.C. 154(b) by 2643 days.

(21) Appl. No.: 11/336,081

(22) Filed: Jan. 20, 2006

(65) Prior Publication Data

US 2007/0174055 A1  Jul. 26, 2007

(51) Int. Cl.
*G10L 15/06* (2013.01)
(52) U.S. Cl.
USPC ............ 704/243; 704/251; 704/254; 704/255
(58) Field of Classification Search
USPC ........................... 704/243, 251–252, 254–255
See application file for complete search history.

(56) References Cited

U.S. PATENT DOCUMENTS

| | | | |
|---|---|---|---|
| 4,731,811 A | 3/1988 | Dubus | |
| 4,776,016 A | 10/1988 | Hansen | |
| 5,476,010 A | 12/1995 | Fleming et al. | |
| 5,805,672 A | 9/1998 | Barkat et al. | |
| 5,832,440 A | 11/1998 | Woodbridge | |
| 6,073,099 A * | 6/2000 | Sabourin et al. | 704/256.6 |
| 6,112,103 A | 8/2000 | Puthuff | |
| 6,122,612 A * | 9/2000 | Goldberg | 704/231 |
| 6,223,158 B1 * | 4/2001 | Goldberg | 704/252 |
| 6,256,611 B1 | 7/2001 | Ali-Yrkko | |
| 6,289,140 B1 | 9/2001 | Oliver | |
| 6,438,520 B1 | 8/2002 | Curt et al. | |
| 6,505,780 B1 | 1/2003 | Yassin et al. | |
| 6,587,824 B1 | 7/2003 | Everhart et al. | |
| 6,684,185 B1 * | 1/2004 | Junqua et al. | 704/243 |
| 6,690,772 B1 | 2/2004 | Naik et al. | |
| 6,735,632 B1 | 5/2004 | Kiraly et al. | |
| 6,738,738 B2 | 5/2004 | Henton | |
| 6,804,806 B1 | 10/2004 | Bansal | |
| 6,836,758 B2 | 12/2004 | Bi et al. | |
| 7,110,949 B2 * | 9/2006 | Bushey et al. | 704/251 |
| 7,181,398 B2 * | 2/2007 | Thong et al. | 704/254 |
| 7,292,978 B2 * | 11/2007 | Endo et al. | 704/243 |
| 7,299,179 B2 * | 11/2007 | Block et al. | 704/254 |
| 7,315,818 B2 * | 1/2008 | Stevens et al. | 704/235 |
| 7,467,087 B1 * | 12/2008 | Gillick et al. | 704/260 |
| 2003/0083873 A1 | 5/2003 | Ross et al. | |
| 2003/0120493 A1 | 6/2003 | Gupta | |
| 2005/0010412 A1 * | 1/2005 | Aronowitz | 704/254 |
| 2005/0182558 A1 * | 8/2005 | Maruta | 704/246 |
| 2007/0073539 A1 | 3/2007 | Chengalvarayan et al. | |

OTHER PUBLICATIONS

Ng et al. "Recent Advances in Cantonese Speech Recognition," Proceedings of International Symposium on Multi-Technology Information Processing, 1996, pp. 139-144.*
Ververidis et al. "Automatic speech classification to five emotional states based on gender information". In Proc. 12th European Signal ProcessingConference, Sep. 2004, pp. 341-344.*

(Continued)

*Primary Examiner* — Vijay B Chawan
(74) *Attorney, Agent, or Firm* — Anthony Luke Simon; Reising Ethington P.C.

(57) ABSTRACT

A method for dynamic nametag scoring includes receiving at least one confusion table including at least one circumstantial condition wherein the confusion table is based on a plurality of phonetically balanced utterances, determining a plurality of templates for the nametag based on the received confusion tables, and determining a global nametag score for the nametag based on the determined templates. A computer usable medium with suitable computer program code is employed for dynamic nametag scoring.

13 Claims, 8 Drawing Sheets

(56) References Cited

OTHER PUBLICATIONS

U.S. Appl. No. 10/444,270, filed May 23, 2003, Arun.
U.S. Appl. No. 11/014,497, filed Dec. 16, 2004, Chengalvarayan et al.
"Robust HMM Training for Unified Dutch and German Speech Recognition", Rathi Chengalvarayan, Lucent Speech Solutions, Lucent Technologies Inc., pp. 509-512.
R. Chengalvarayan and L. Deng, "HMM-Based Speech Recognition Using State-Dependent, Discriminatively Derived Transforms on Mel-Warped DFT Features", IEEE Transactions on Speech and Audio Processing, vol. 5, No. 3, pp. 243-256, May 1997.
P. Lucey, T. Martin and S. Sridharan, "Confusability of Phonemes Grouped According to Their Viseme Classes in Noisy Environments", 10th Australian International Conference on Speech Science and Technology, pp. 265-270, Dec. 2004.

* cited by examiner

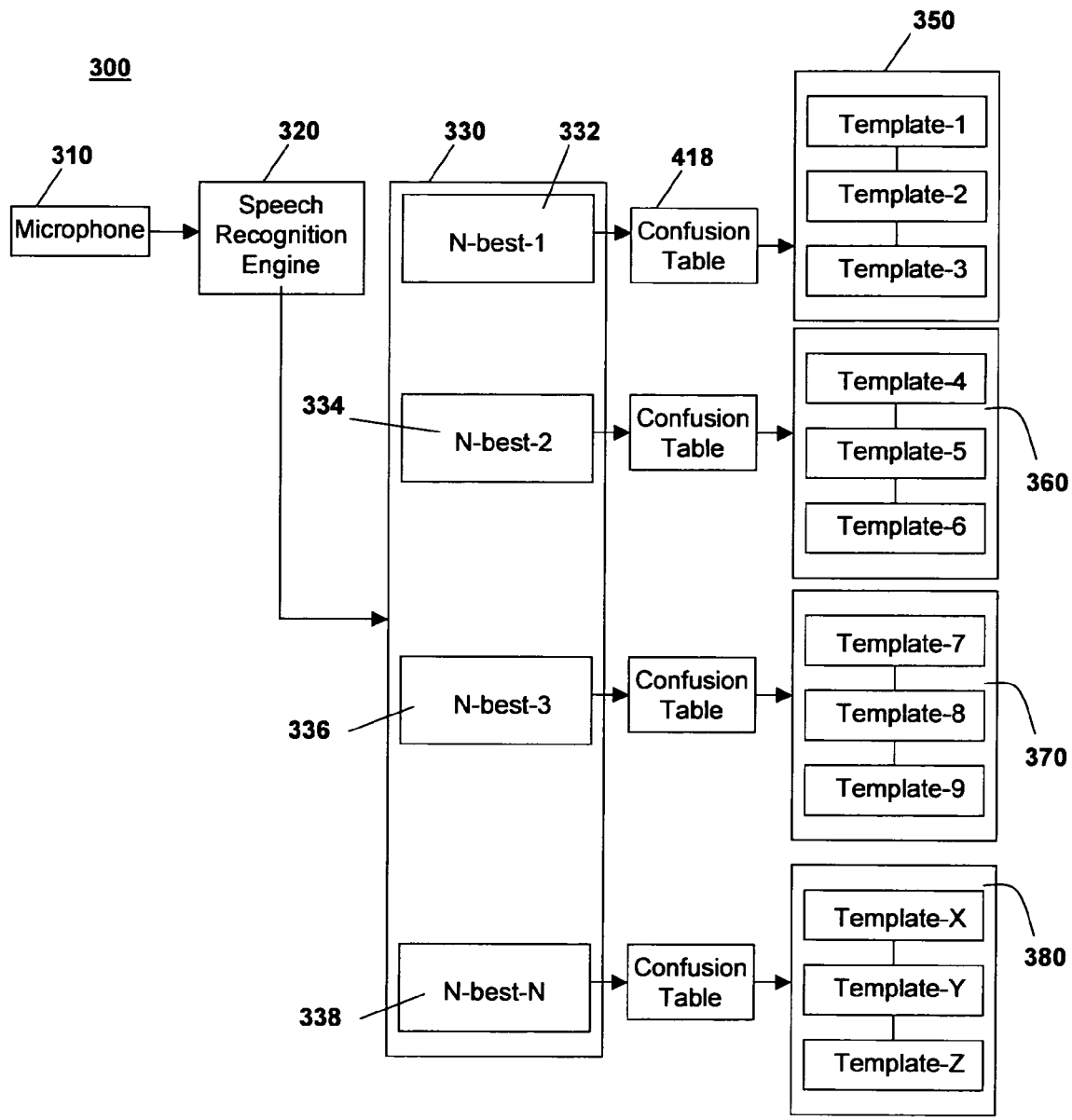

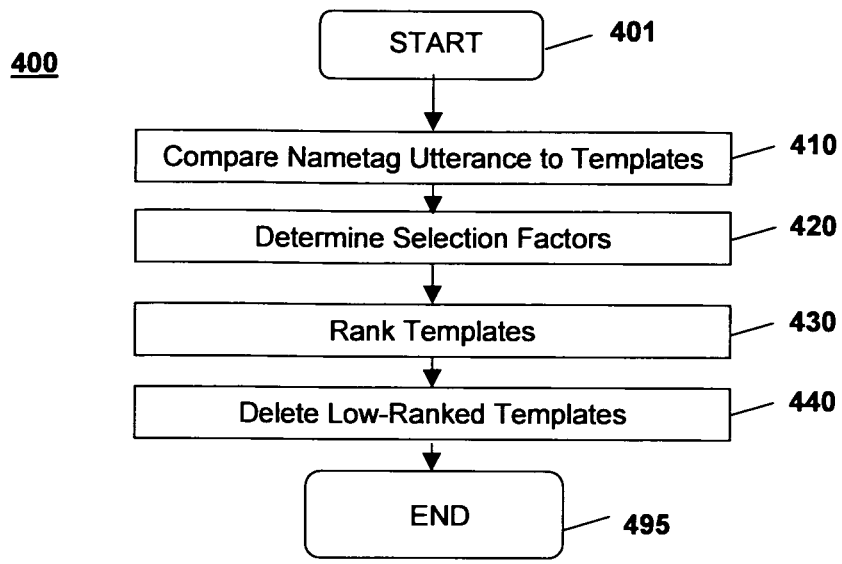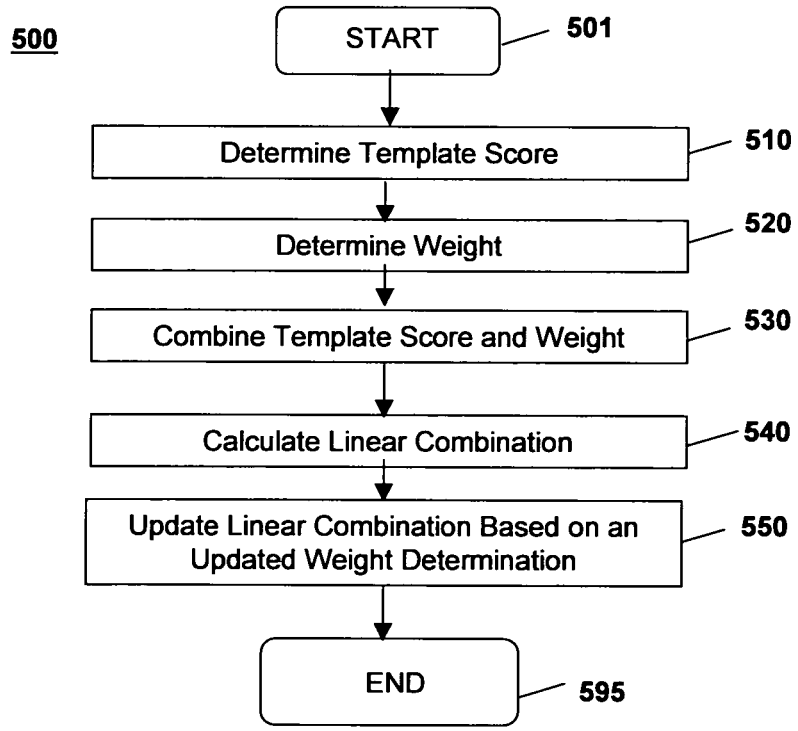

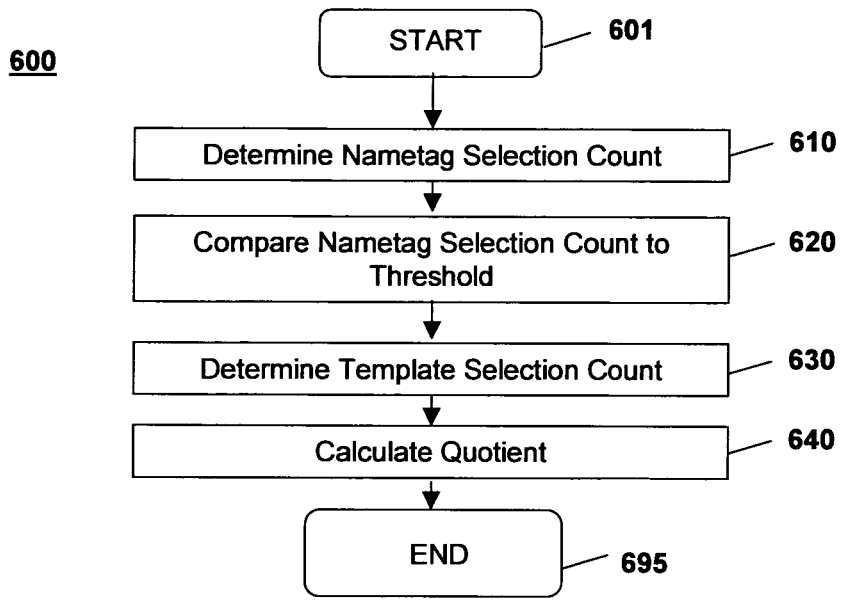

900

METHOD AND SYSTEM FOR DYNAMIC NAMETAG SCORING

FIELD OF THE INVENTION

This invention relates generally to speech recognition systems. In particular the invention relates to a method and system for dynamic nametag scoring.

BACKGROUND OF THE INVENTION

Various schemes have been developed to improve the performance of speech recognition systems. Many factors interact to degrade the performance of speech recognition systems in mobile vehicles. Factors such as ambient noise conditions, cabin design variables, speaker gender, and speaker dialect interact to influence the acoustic signal received by the speech recognition signal. These factors cause decoding errors and false alarms thereby increasing user frustration with the system.

Current speech recognition systems use a single template for each nametag. The template is used to match the nametag utterance received from the user with the proper nametag in the system. The template is created during system setup by receiving multiple utterances for each nametag and storing the correctly identified nametag in the template. The template will be based on the speaker, vehicle and environmental conditions that exist when it is created. User frustration occurs when multiple unsuccessful attempts to match the utterance with the nametag occur. These systems cannot adapt to new speakers or speaking scenarios without retraining of the system.

A user can train the system under a variety of conditions and store a different template for each scenario. This requires additional user involvement and increases training time required by the system. Furthermore, the templates are not differentiated and probability of selecting a proper template is not increased.

Multiple speech recognition engines run in parallel can be used to increase the likelihood of selecting the proper template as described in U.S. Pat. No. 6,836,758 to Bi, et al. This method produces more accurate nametag recognition but still does not account for variations in speaker, vehicle and environment nor does it adapt to changes in the acoustic signal without retraining. In addition, increased computational power and storage capacity is required to accommodate the additional speech recognition engines.

A method for biasing paths in a Markov model is proposed in U.S. Pat. No. 4,741,036 to Bahl, et al. The individual phones that distinguish similar words are given more weight to emphasize the differences between the words. This method improves the distinction between similar words but does not account for the effects of ambient noise and speaker variables such as dialect or gender. Additionally the weighting vectors are static and determined at the time a system is trained. The weighting vectors are only updated to account for changes in speech input by retraining the system.

It is therefore desirable to provide a method and system for dynamic nametag scoring that overcomes the limitations, challenges, and obstacles described above.

SUMMARY OF THE INVENTION

One aspect of the invention provides a method for dynamic nametag scoring. The method includes receiving at least one confusion table including at least one circumstantial condition wherein the confusion table is based on a plurality of phonetically balanced utterances, determining a plurality of templates for the nametag based on the received confusion tables, and determining a global nametag score for the nametag based on the determined templates.

Another aspect of the invention provides a computer readable medium storing a computer program including computer program code for dynamic nametag scoring. The medium includes computer program code for receiving at least one confusion table including at least one circumstantial condition wherein the confusion table is based on a plurality of phonetically balanced utterances, computer program code for determining a plurality of templates for the nametag based on the received confusion tables, and computer program code for determining a global nametag score for the nametag based on the determined templates.

A third aspect of the invention provides a system for dynamic nametag scoring. The system includes means for receiving at least one confusion table including at least one circumstantial condition wherein the confusion table is based on a plurality of phonetically balanced utterances, means for determining a plurality of templates for the nametag based on the received confusion table, and means for determining a global nametag score for the nametag based on the determined templates.

A fourth aspect of the invention provides a method for determining a plurality of confusion tables including receiving a plurality of phonetically balanced utterances, generating a plurality of component sequences based on the test utterances and at least one circumstantial condition, determining a confusion matrix based on the component sequences and the test utterances, and generating a confusion table based on the confusion matrix.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 illustrates a schematic of one example of a system for generating a plurality of templates, in accordance with the invention;

FIG. 4 illustrates a flowchart representative of one example of a method for selecting templates, in accordance with the invention;

FIG. 5 illustrates a flowchart representative of one example of a method for determining the global nametag score, in accordance the invention;

FIG. 6 illustrates a flowchart representative of one example of a method for calculating the weight for a template, in accordance with the invention;

DETAILED DESCRIPTION OF THE PRESENTLY PREFERRED EXAMPLES

Figure 1:
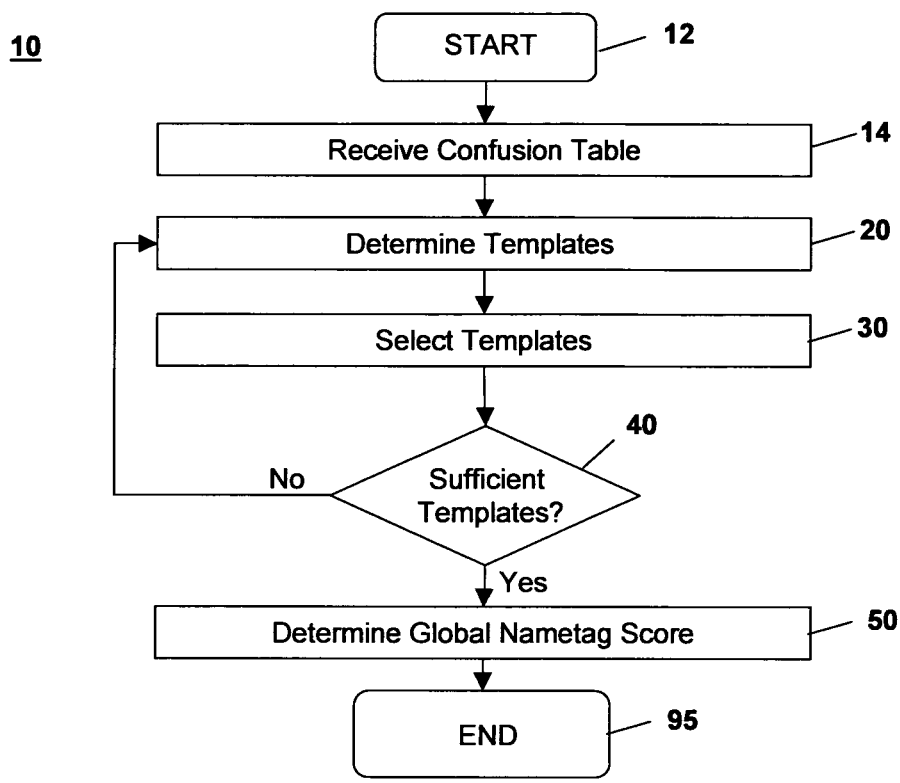
FIG. 1 illustrates a flowchart representative of one example of a method for dynamic nametag scoring, in accordance with the invention.

FIG. 1 illustrates a flowchart representative of one example of a method for dynamic nametag scoring, in accordance with the invention at 10. A nametag template is a series of feature vectors representing a command, proper name, or other word used by a speech recognition system. The template represents a string of components such as syllables or phonemes that constitute the nametag. In one example, the components are a series of states and state transitions. The method begins at 12.

A nametag is broken into its components, such as syllables or phonemes, and stored as a template. Multiple templates are possible when taking into account that some syllables or phonemes can be confused with other syllables or phonemes. In some speech recognition systems, a Hidden Markov Model (HMM) is used to inform the system's interpretation of the syllables or phonemes. For example, phoneme chains can branch as a result of phoneme confusion. The HMM evaluates the probability of various branches and biases the system's interpretation of the branching to increase the frequency of selecting the most likely branch.

The speech recognition engine receives a confusion table based on a plurality of phonetically balanced utterances and circumstantial conditions (block 14). A phonetically balanced utterance contains an equal number of phonemes uttered for a set of test sentences. For example, if a test set contains one hundred different sentences to utter, there will be an equal number of phonemes representing 'a', an equal number of phonemes representing 'b', and so on. Advantageously, phonetically balanced utterances avoid a statistical bias toward any particular phoneme. In one example, the speech recognition engine is operated within a telematics unit. The confusion table is generated, for example, from either a phoneme confusion matrix or a syllable confusion matrix. The confusion table reflects the fact that certain components of speech can be confused with a similar component by a speech recognition engine such as the confusion of the sounds "m" and "n". A confusion matrix is constructed from a set of phonetically balanced utterances. The cells of the confusion matrix are given a numerical score. In one example, the numerical score represents a count of instances a phoneme is misrecognized for a recognition that is not expected. If the expected and recognized phonemes match, then those values are discarded. A confusion matrix is unsorted, that is, if 'm' is misrecognized as 'n', and 'm' is a positional distance from 'n' in the confusion matrix, there may be numerical scores in the row cells adjacent to the cell representing 'm' that are of greater of lesser numerical value. A confusion table is sorted, that is, the row cells are sorted in ascending or descending ranking order. For example, if 'm' is most frequently misrecognized as 'n', then the phoneme for 'm' will be placed in the first cell position of the confusion table. If 'r' is the next most frequently misrecognized phoneme misrecognized as 'n', then the phoneme for 'r' will be in the second cell position, and so on. Once the confusion table is constructed, the confusion matrix may be discarded. Circumstantial conditions are various factors that affect the incoming voice signal as detected by the system and affect the differentiation of various speech components by the system.

Circumstantial conditions include noise introduced into the phonetically balanced utterances and speaker based variables such as the gender or the dialect of the speaker. The acoustic model, used when developing the confusion table from the test utterances, is trained for the application utilizing the nametag utterances as user input. One example of an application is a telematics system installed in a mobile vehicle. A confusion table designed for or best fitting a user is saved in a user based system such a vehicle command processor or at a remote server for later use.

Figure 2:
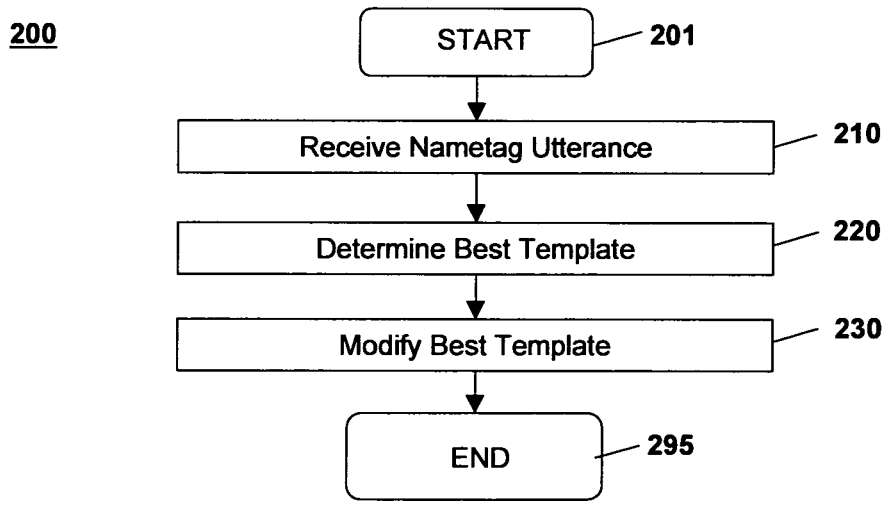
FIG. 2 illustrates a flowchart representative of one example of a method for determining the plurality of templates, in accordance with the invention.

When the user trains the system, the user utters a nametag and the system stores the nametag utterance from the user. The user is required to utter the nametag only once. A plurality of templates is determined (block 20), as shown in FIG. 2, from the nametag utterance using the confusion tables received at block 14.

The templates created for the nametag utterance are then selected based on at least one selection factor (block 30). Selection allows the exclusion of templates that exhibit a low probability of providing a correct match to the nametag based on a comparison of the nametag to the templates. Template selection factors include a score, a syllable count, and a phoneme count. Templates are either saved or deleted based on the selection factor.

If a predefined number of templates for a nametag are not determined (block 40) additional templates are determined and then selected (block 20 and block 30) until the predefined number of templates for that nametag is reached.

A global nametag score is determined (block 50) for each nametag stored in the system. One example of a method to calculate global nametag scores is detailed in FIG. 5. Each template associated with the nametag contributes to the global nametag score. The method terminates (block 95).

FIG. 2 illustrates a flowchart representative of one method for determining the plurality of templates, in accordance with the invention at 200. A nametag utterance is received at a speech recognition engine (block 210). When the nametag utterance is received it is stored as a digitized audio string generated by an analog-to-digital converter. The speech recognition engine determines a best template for the received nametag utterance (block 220). The audio string is matched, using a waveform analysis, to a stored model containing templates of known meaning. The template that most closely conforms to the audio string corresponding to the nametag utterance is chosen as the best template. The best template, therefore, contains the most probable or best pronunciation of the nametag.

The system modifies the best template based on at least one confusion table (block 230). The best template is modified by substituting, deleting, or inserting phonemes in the best template based on the confusion table. In one example, substitution rules are imposed on the phoneme substitutions. For example, a substitution rule specifies that the initial and final consonants of the nametag template can be substituted, deleted, or inserted. In another example, a rule specifies that vowel segments are left unmodified since vowel segments tend to carry the greatest energy in the speech signal. The circumstantial conditions associated with the different confusion tables allow the system to create multiple templates that resemble various speaking scenarios. In one example, multiple or alternate confusion tables are used to account for a variety of circumstantial conditions.

FIG. 3 illustrates a schematic of one example of a system for generating a plurality of templates, in accordance with the invention at 300. The nametag utterance is received through microphone 310. Speech recognition engine 320 generates an N-best template list 330. N-best-1 template 332 is processed through confusion table 418 to generate multiple templates 350. In one example, additional templates 360, 370, 380 are created by using additional N-best templates 334, 336, 338 of the nametag utterance. In another example, another type of speech recognition engine, such as a dynamic time warping based engine, provides a different N-best list used for the creation of additional templates. The templates generated represent the phoneme confusion accounting for the circumstantial conditions embedded in the confusion table.

FIG. 4 illustrates a flowchart representative of one example of a method for selecting the templates, in accordance with the invention at 400.

The system compares the stored nametag utterance from the user with all templates associated with that user using the acoustic model defined for the system (block 410). Selection factors are determined from the comparison (block 420). When a nametag utterance is compared to the complete template list, a word distance or score for each template is returned. The score represents the degree of match between the nametag utterance and the template and is used as a selection factor. In one example, a component count such as an average phoneme count of the template is an additional selection factor.

The templates are ranked based on the selection factors to determine which templates to delete (block 430). Low ranking templates have a small probability of providing a nametag match and are deleted (block 440) to save storage space and reduce computational expense. If the phoneme count in the template is greater than or less than the phoneme count of the highest ranking template by a predetermined value, the template is invalid and is discarded.

FIG. 5 illustrates a flowchart representative of one example of a method for determining the global nametag score, in accordance with the invention at 500. The global nametag score allows selection of a template based on the probability of successful retrieval rather than being based on identification of the template that provides the best match (score) to the nametag. Each template contributes proportionally to the global nametag score. The global nametag score changes as the system adapts to changing input. For example, the system adapts by adjusting the contribution of each template to the global nametag score for a nametag. The contribution of each template is dynamically varied by associating a weight with the template in determining the global nametag score.

A template score is determined for each template (block 510). The score for a template is determined as shown at block 420 of FIG. 4. The nametag utterance (i.e., the series of feature vectors) is compared against patterns known to the system, in the templates. A template score is obtained for each template based on an alignment of the nametag utterance with the templates. The alignment results in a score reflecting probability that a template correctly matches the nametag utterance. Template scores are calculated using any appropriate technique.

A weight is determined for each template (block 520). The weight is a probability factor and is based on the frequency the associated template is correctly selected for the nametag. One example of a method to calculate weights is detailed in FIG. 6.

The score for each template is combined with the weight for that template resulting in a weighted template score (block 530). The weighted template score is the product of the weight for that template and the template score. The global nametag score is found by calculating a linear combination of the weighted template scores for all saved templates associated with that nametag (block 540). The global nametag score is continuously updated based on an updated weight determination (block 550).

In one example, the global score for a nametag is calculated as follows:

$$S_j = \sum_{i=1}^{N_j} W_{ij} S_{ij}$$

such that $$\sum_{i=1}^{N_j} W_{ij} = 1$$

Where:
$S_j$ is the global score for the jth nametag;
$W_{ij}$ is the weight for the $i^{th}$ template of the $j^{th}$ nametag;
$S_{ij}$ is the score for the ith template of the $j^{th}$ nametag; and
$N_j$ is the total number of templates available for the $j^{th}$ nametag.

The method terminates (block 595).

FIG. 6 illustrates a flowchart representative of one example of a method for calculating the weight for a template, in accordance with the invention at 600. As used herein, the weight is a variable indicative of a selection frequency for a template. To determine the weight, a nametag selection count is determined (block 610). The nametag selection count is the number of times a particular nametag is matched to any template.

A threshold count representing a minimum value for the nametag selection count is pre-defined. Once the threshold count is realized, as determined by comparing the nametag selection count to the threshold (block 620), a template selection count is determined (block 630). The template selection count is a count of the number of instances a particular template is selected for a particular nametag. The weight is then determined by taking the quotient of the template selection count and the nametag selection count (block 640). In one example the weight is calculated:

$$W_i = \frac{C_i}{\sum_{i=1}^{N} C_j} C_i \geq 0 \text{ and } 0 \leq W_i \leq 1$$

$C_i \geq 0$ and $0 \leq W_i \leq 1$

Where:
$W_i$ is the weight for the $i^{th}$ template;
$C_i$ is the template selection count for the $i^{th}$ template;
$C_j$ is the template selection count for the $j^{th}$ template; and
N is the total number of templates defined for the selected nametag.

The weight will change as the template selection counts change. The weight assigned to a template increases as the template selection count for that template increases.

Statistically, as the sample size increases the weights should stabilize unless a change is introduced into the input to the system such as a by new user or by a noise condition not previously accounted for. A change in the input will cause a random oscillation of the weights. If unstable weight values for a nametag are detected, the system will revert back to the default method for that nametag. The default method does not weight the templates and instead relies on identifying a best match to determine the correct nametag. The system will start accumulating data for recalculating the weight to account for the change. In one example, the system can store user dependent weights in a user profile which allows multiple users to share the same system. The method terminates (block 695).

Figure 7:
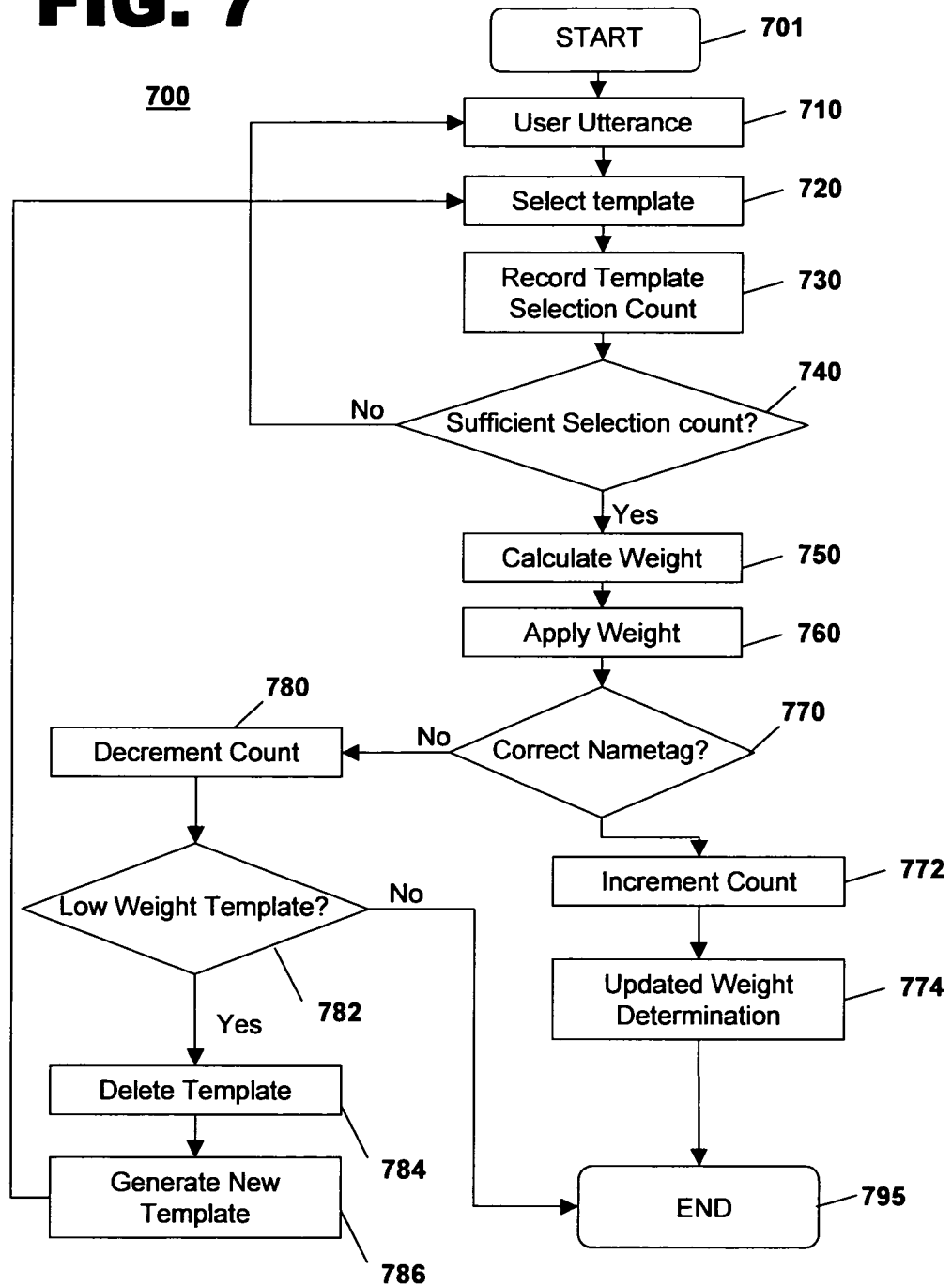
FIG. 7 illustrates a flowchart representative of one example of a method for dynamic learning of weights, in accordance with the invention.

FIG. 7 illustrates a flowchart representative of one example of a method for dynamic learning of weights, in accordance with the invention at 700. The method starts at 701. The user utters the nametag (block 710) and the audio is received at a speech recognition engine. In one example, the audio is received at an in-vehicle microphone operatively coupled to a telematics unit in a mobile vehicle.

A template is selected that best matches the audio of the received nametag utterance (block 720). Prior to calculating a weight, the system accumulates an appropriate number of samples to support the statistical significance of the weight calculation. For example, the number of user utterances and resulting template selections reaches a pre-defined threshold, such as 100 samples before the weight is calculated. The system will advance a nametag sample count each time a nametag utterance is detected (block 730).

Sample collection will continue until the pre-defined threshold is reached (block 740). Once that threshold is reached, the weight is calculated as shown in FIG. 6 (block 750). If the pre-defined threshold is not met (block 740), then the method returns to block 710.

A weight is calculated for and applied to each template as shown in FIG. 5 and FIG. 6 (block 760). The weight is based on template usage. The most frequently chosen templates are assigned the highest weight while less frequently chosen templates received a lower weight. For example, if a third template is chosen most often it will be assigned a higher weight thereby having a higher contribution to the global score. Without the weight, the system will continue to select the template based on determining the best match to the nametag. The number of nametag decoding errors is reduced by biasing template selection toward the most frequently selected template.

A nametag retrieval is successful when the intended nametag is returned. A selection count is modified based on the nametag retrieval (block 770). The selection count for the selected template is incremented for a correct nametag retrieval (block 772). An increase in the selection count for a template will increase the weight for that template. An updated weight determination is made (block 774) and the method ends (block 795). If an incorrect nametag is returned, the selection count is decremented which in turn decreases the weight for that template (block 780). The dynamic adjustment of weights reinforces correct template selections and penalizes incorrect template selections.

If the weight for a particular template is consistently penalized its value will approach zero. A limit can be defined for the weight below which the associated template is determined as invalid (block 782). If the weight is not below the pre-defined limit, the method terminates (block 795).

When the system determines that the weight for a template falls below the pre-defined limit, the template will be deleted (block 784). The deleted template will be replaced, for example, by a new template generated based on the most recently spoken nametag utterance (block 786). Once a new template is generated, the method returns to block 720 and statistics will be collected for the newly generated templates until the pre-defined threshold is reached. A weight will then be calculated for the new template and the selection process will continue. The method terminates (block 795).

Figure 8:
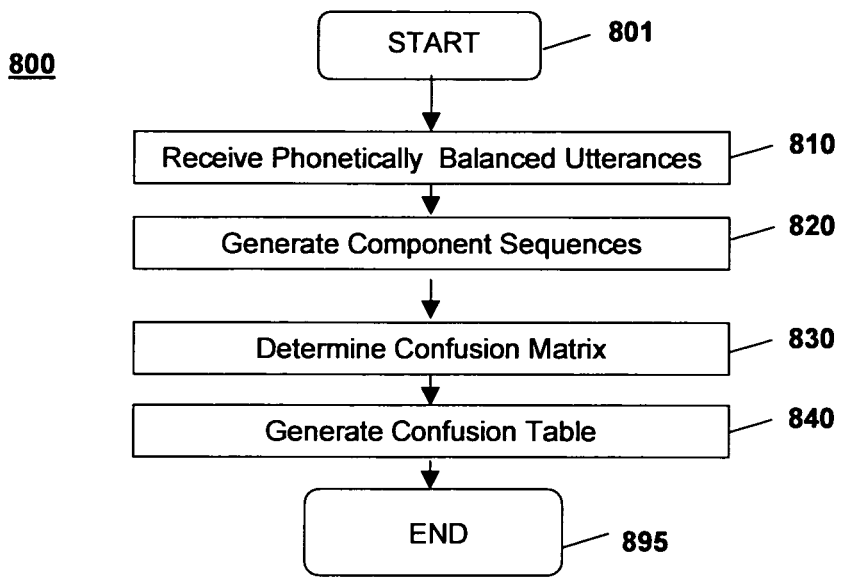
FIG. 8 illustrates a flowchart representative of one example of a method for determining at least one confusion table, in accordance with the invention.

FIG. 8 illustrates a flowchart representative of one example of a method for determining at least one confusion table, in accordance with the invention at 800.

In one example, phonetically balanced utterances are received (block 810) and passed through a recognizer such as a free phoneme recognizer. Component sequences, such as phoneme sequences are generated (block 820) and saved to a log file. Several phoneme strings will be generated for each test utterance. The expected phoneme sequence for an utterance is then compared with the recognized phoneme string from the test utterance in determining the phoneme confusion matrix (block 830).

A confusion table that is a lookup table is generated from the confusion matrix (block 840). Each phoneme of the nametag utterance is listed in the first column of the confusion table. Subsequent columns each contain a confusable phoneme for the phoneme listed in the first column. The columns are organized, for example, according to a confusability ranking from high to low.

In one example, three error types are accounted for in the confusion table phoneme substitutions, phoneme deletions and phoneme insertions. A substitution involves replacing the phoneme in the first column with a phoneme from one of the subsequent columns, a deletion involves removing the phoneme in the first column from the phoneme sequence and an insertion involves placing an additional phoneme in the phoneme sequence. The confusion table specifies the phonemes that can be deleted and those that can be inserted.

In one example the test utterances are separated based on ambient noise conditions and multiple confusion tables are available based on an ambient noise classification such as high, medium and low. Vehicle dependent test utterances can be simulated as described in U.S. patent application Ser. No. 11/235,961 to Chengalvarayan which is incorporated herein by reference in its entirety. By the same methods additional confusion tables based on factors such as gender, dialect, vehicle type, ambient noise conditions, and vehicle operating condition can be generated. The method terminates (block 895).

Figure 9:
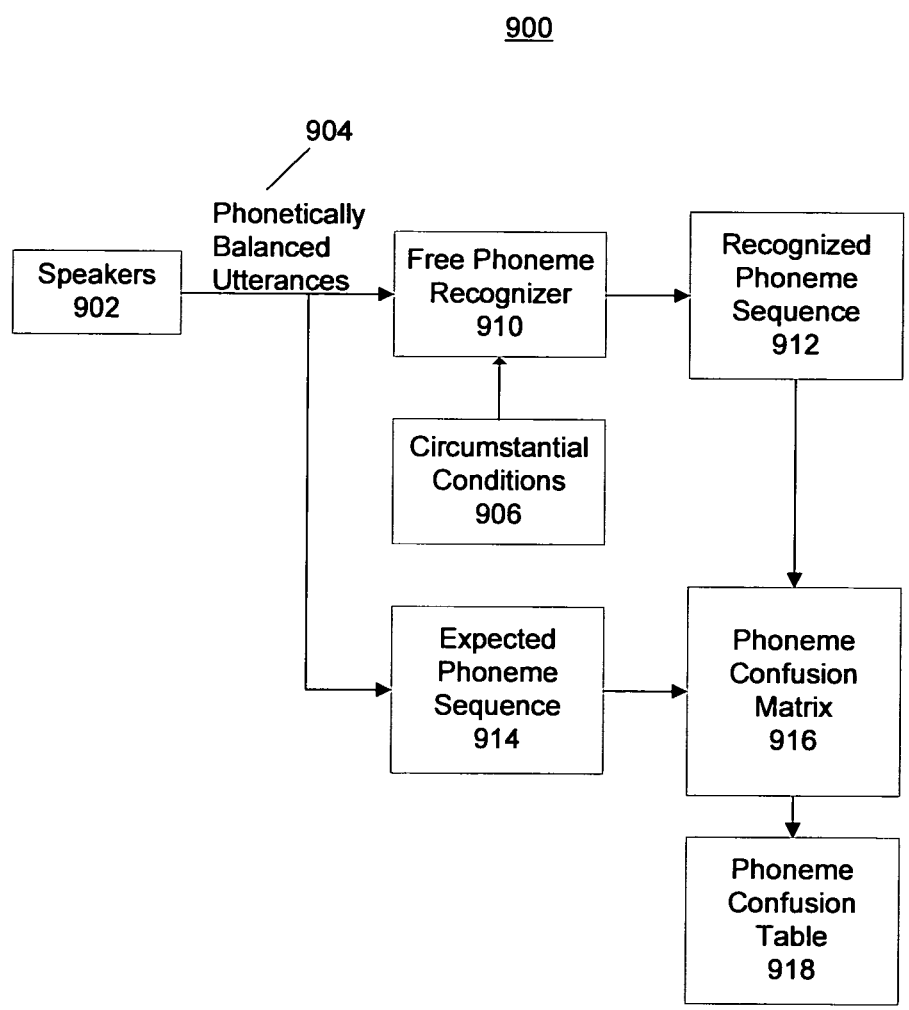
FIG. 9 illustrates a schematic of one example of a system for determining at least one confusion table, in accordance with the invention.

FIG. 9 illustrates a schematic of one example of a system for determining at least one confusion table, in accordance with the invention at 900. The template determining system includes speakers 902 providing a plurality of phonetically balanced utterances 904. In one example, one or more speakers 902 providing the phonetically balanced utterances 904 are located in a remote facility. Circumstantial conditions 906, such as gender, dialect, noise conditions, vehicle operating conditions are convolved with the phonetically balanced utterances 904 and passed through a free phoneme recognizer 910. The free phoneme recognizer 910 contains one or more acoustic models. The recognized phoneme sequences 912 output by the recognizer 910 are aligned with the expected phoneme sequences 914 for an utterance creating a phoneme confusion matrix 916. The phoneme confusion matrix 916 is converted to a confusion table 918. Multiple confusion tables can result from segregating phonetically balanced utterances 904 based on circumstantial conditions 906. In another example, circumstantial conditions 906 are simulated and combined with the phonetically balanced utterances 904.

The resulting confusion tables 918 are stored in a telematics unit 920 of a mobile vehicle 922 or a remote server 930. In one example, the confusion tables based on a particular vehicle type and user type are downloaded to the telematics unit within the mobile vehicle when the mobile vehicle is supplied to the user.

Figure 10:
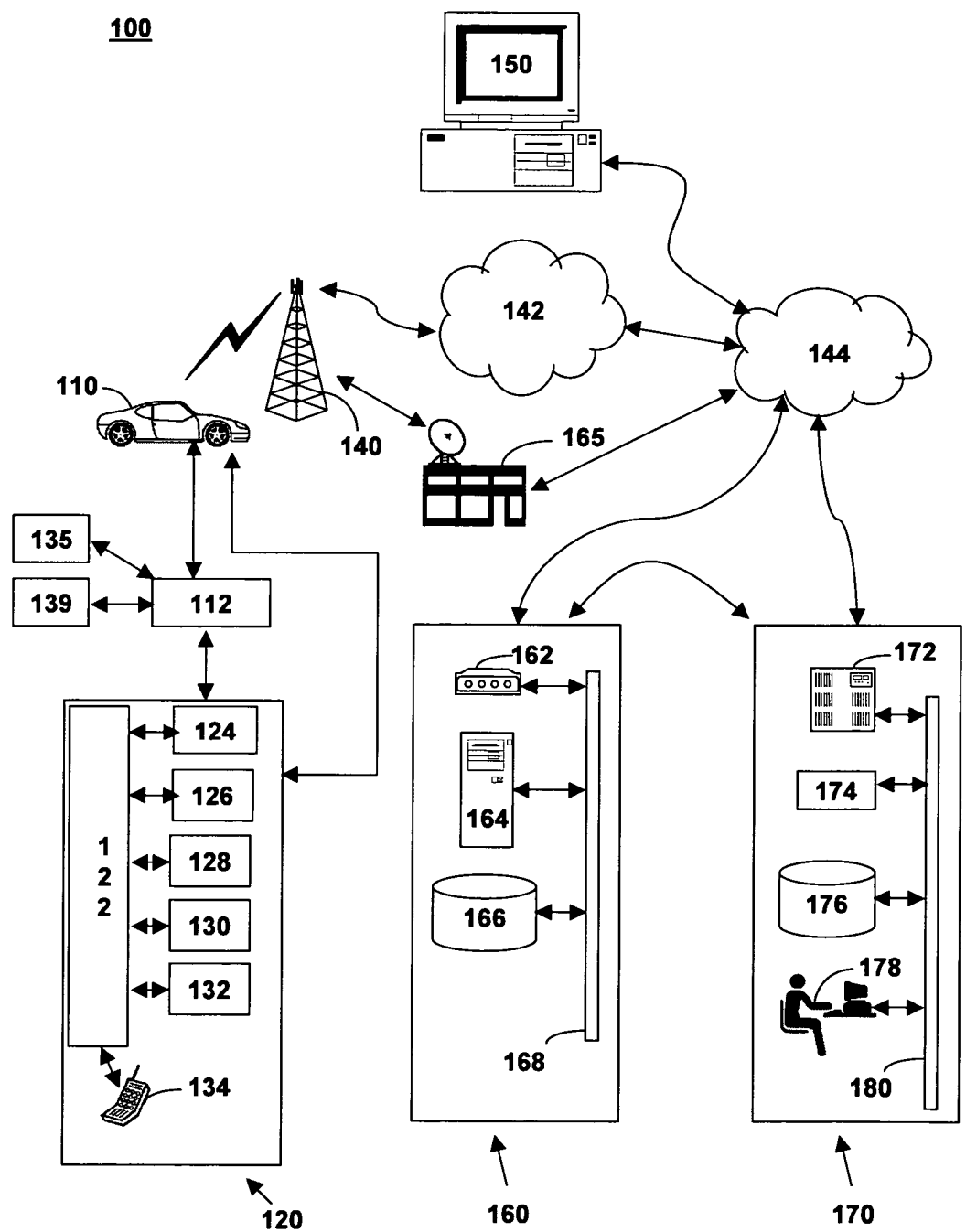
FIG. 10 illustrates a schematic of one example of a system for dynamic nametag scoring, in accordance with the invention.

FIG. 10 illustrates a schematic of one example of a system for dynamic nametag scoring, in accordance with the invention at 100. The dynamic nametag scoring system includes a mobile vehicle communication unit (MVCU) 110, a mobile vehicle communication network 112, one or more embedded modules 139, a communication device such as a telematics unit 120, one or more wireless carrier systems 140, one or more communication networks 142, one or more land networks 144, one or more client, personal, or user computers 150, one or more web-hosting portals 160, and one or more call centers 170. In one example, MVCU 110 is implemented as a mobile vehicle equipped with suitable hardware and software for transmitting and receiving voice and data communications. In one example, a display 135 such as a dialed digital display in a radio unit or in an instrument panel is embedded in MVCU 110. In other examples, automated recall notification system 100 includes additional components not relevant to the present discussion. Mobile vehicle communication systems and telematics units are known in the art.

Embedded modules 139 are any electronic module configured to enable or assist in the operation of MVCU 110, or any of its included systems. In one example, the embedded module 139 includes a speech recognition engine. For example, one embedded module performs odometer functions, while another embedded module controls HVAC operations within the mobile vehicle. In another example, an embedded module senses a mobile vehicle operation input, such as a key cycle, and sends a signal via vehicle communication network 112 that is received by telematics unit 120. Any number of embedded modules 139 can be included.

MVCU 110 is also referred to as a mobile vehicle in the discussion below. In operation, MVCU 110 may be implemented as a motorvehicle, a marine vehicle, or as an aircraft. MVCU 110 may include additional components not relevant to the present discussion.

MVCU 110, via a mobile vehicle communication network 112, sends signals to various units of equipment and systems within mobile vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, mobile vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one example, mobile vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

In one example, telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other examples, telematics unit 120 is implemented without one or more of the above listed components such as, for example, GPS unit 126 or speakers 132 or includes additional components not relevant to the present discussion.

In various examples, processor 122 is implemented as a digital signal processor (DSP), microcontroller, microprocessor, controller, host processor, or vehicle communications processor. In an example, processor 122 is implemented as an application-specific integrated circuit (ASIC). In another example, processor 122 is implemented as a processor working in conjunction with a central processing unit (CPU) performing the function of a general purpose processor. GPS unit 126 provides longitude and latitude coordinates of the mobile vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, satellite uplink facility 165, and call center 170. In one example, land network 144 is a public-switched telephone network (PSTN). In another example, land network 144 is implemented as an Internet protocol (IP) network. In other examples, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one example, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. In one example, modem 162 resides inside web server 164. Land network 144 transmits data communications between web-hosting portal 160 and call center 170.

Web server 164 receives user-preference data from user computer 150 via land network 144. In alternative examples, computer 150 includes a wireless modem to send data to web-hosting portal 160 through a wireless communication network 142 and a land network 144. Data is received by land network 144 and sent to one or more web servers 164. In one example, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. In one example, web server 164 includes computer applications and files for managing and storing personalization settings supplied by the client and subscriber status supplied by telematics unit 120. For each subscriber, the web server potentially stores hundreds of preferences for wireless vehicle communication, networking, maintenance and diagnostic services for a mobile vehicle.

In one example, one or more web servers 164 are networked via network system 168 to distribute data among its network components such as database 166. In an example, database 166 is a part of or a separate computer from web server 164. Web server 164 sends data transmissions with status information to call center 170 through land network 144.

Call center 170 is a location where many calls are received and serviced at the same time, or where many calls are sent at the same time. In one example, the call center is a test center facilitating communications to mobile vehicle 110 for testing of embedded modules 139. In another example, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other examples, call center 170 and web-hosting portal 160 are located in the same or in different facilities.

In one example, call center 170 receives a recall report and creates a recall communication instruction based on the recall report. Call center 170 then sends recall communication instructions to telematics unit 120 of mobile vehicle 110 involved in a recall.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives requests for a variety of services from the client via computer 150, web-hosting portal 160, and land network 144 and awareness messages from telematics unit 120. Communication services manager 174 transmits requests for subscriber status and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one example, communication services advisor 178 is implemented as a real advisor. In an example, a real advisor is a human being in verbal communication with a user or subscriber (e.g., a client) in MVCU 110 via telematics unit 120. In another example, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, recall notifications navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative example, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

While the examples of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for dynamic nametag scoring comprising:
   receiving at a speech recognition engine at least one confusion table stored in at least one of a mobile vehicle telematics unit or a remote server and being sorted by phoneme misrecognition and including at least one circumstantial condition including at least one of a user gender, a user dialect, a vehicle type, or a vehicle operating condition, and wherein the confusion table is based on a plurality of phonetically balanced utterances;
   determining a plurality of templates for a nametag based on the received at least one confusion table by using the speech recognition engine;
   selecting templates from the determined plurality of templates; and
   determining a global nametag score for the nametag based on a weighting indicative of a template selection frequency, wherein more frequently selected templates are assigned higher weights and less frequently selected templates are assigned lower weights.

2. The method of claim 1 wherein determining the plurality of templates for at least one nametag comprises:
   receiving a nametag utterance at a speech recognition engine;
   determining at least one best template for the received nametag utterance at the speech recognition engine based on a stored model; and
   modifying the best template based on at least one confusion matrix to derive a plurality of templates corresponding to the best template.

3. The method of claim 1 wherein determining the global nametag score comprises:
   determining at least one template score for each template;
   determining at least one weight for each template;
   combining the template score and the weight to yield a weighted template score; and
   calculating a linear combination of the weighted template scores for all templates associated with a particular nametag.

4. The method of claim 3 wherein determining at least one weight for each template comprises:
   determining a nametag selection count;
   determining that the nametag selection count meets a threshold count; and thereafter:
   determining a template selection count; and
   calculating the quotient of the template selection count and the nametag selection count.

5. The method of claim 4 further comprising: modifying the template selection count based on a nametag retrieval.

6. The method of claim 1 further comprising: continuously updating the global nametag score based on an updated weight determination.

7. The method of claim 1 wherein the selecting step is based on at least one selection factor.

8. The method of claim 7 wherein selecting the templates based on at least one selection factor comprises:
   comparing the plurality of templates to a nametag audio string based on an acoustic model;
   determining at least one selection factor based on the comparison;
   ranking the plurality of templates based on the selection factors; and
   deleting at least one template based on the ranking.

9. A method for determining a plurality of confusion tables comprising:
   receiving a plurality of test utterances in a speech recognizer including acoustic models;
   generating via the speech recognizer, a plurality of component sequences based on the test utterances and at least one circumstantial condition;
   determining via the speech recognizer, a confusion matrix based on the component sequences and the test utterances; and
   generating a confusion table based on the confusion matrix but sorted by phoneme misrecognition, and stored in at least one of a mobile vehicle telematics unit or a remote server.

10. A method for dynamic nametag scoring comprising:
    receiving at a speech recognition engine, an utterance for a nametag and at least one confusion table stored in at least one of a mobile vehicle telematics unit or a remote server and being sorted by phoneme misrecognition and including at least one circumstantial condition including at least one of a user gender, a user dialect, a vehicle type, or a vehicle operating condition; and
    determining a plurality of templates for the nametag based on the received at least one confusion table by using the speech recognition engine; and
    selecting templates from the determined plurality of templates.

11. The method of claim 10 wherein the selecting templates is based on at least one selection factor including at least one of a nametag score, a nametag syllable count, or a nametag phoneme count.

12. The method of claim 11 wherein the selecting templates comprises:
    ranking the determined plurality of templates based on the at least one selection factor; and
    deleting at least one template based on the ranking.

13. The method of claim 10, further comprising determining a global nametag score for the nametag based on a weighting indicative of a template selection frequency, wherein more frequently selected templates are assigned higher weights and less frequently selected templates are assigned lower weights.

* * * * *